United States Patent [19]

Yamauchi et al.

[11] Patent Number: 5,058,979
[45] Date of Patent: Oct. 22, 1991

[54] OPTICAL FIBER COUPLER AND A FABRICATION METHOD FOR THE SAME

[75] Inventors: Ryozo Yamauchi, Sakura; Noboru Kawakami, Chiba; Fumio Suzuki, Sanbu, all of Japan

[73] Assignee: Fujikura Ltd., Tokyo, Japan

[21] Appl. No.: 542,469

[22] Filed: Jun. 21, 1990

[30] Foreign Application Priority Data

Jun. 22, 1989 [JP] Japan .................................. 1-159969
Jul. 25, 1989 [JP] Japan .................................. 1-191908

[51] Int. Cl.⁵ .............................................. G02B 6/26
[52] U.S. Cl. ........................................ 385/28; 385/43
[58] Field of Search ............... 350/96.15, 96.16, 96.29, 350/320

[56] References Cited

U.S. PATENT DOCUMENTS

| | | | |
|---|---|---|---|
| 4,449,781 | 5/1984 | Lightstone et al. | 350/96.15 |
| 4,586,784 | 5/1986 | Tremblay et al. | 350/96.15 |
| 4,746,185 | 5/1988 | Shahidi-Hamedani | 350/96.15 |
| 4,763,272 | 8/1988 | McLandrich | 350/96.15 X |
| 4,798,436 | 1/1989 | Mortimore | 350/96.15 |
| 4,822,128 | 4/1989 | Imoto et al. | 350/96.16 |
| 4,869,570 | 9/1989 | Yokohama et al. | 350/96.15 |

Primary Examiner—John D. Lee
Attorney, Agent, or Firm—Sprung Horn Kramer & Woods

[57] ABSTRACT

The present invention provides a wide wavelength range optical fiber coupler that to the greatest extent possible, allows optical coupling which is wavelength independent, and thus demonstrates a constant coupling ratio over a wide range of wavelengths. By causing various irregularities to be formed in the fused-elongated region of an optical fiber coupler, thereby leading to the generation of additional modes in addition to the fundamental modes, while at the same time causing multiple mode coupling in which the above mentioned additional modes participate in the coupling of the fundamental modes, it is possible to selectively control the coupling strength at determined wavelengths and thereby achieve optical coupling which is largely wavelength independent and thus demonstrates a relatively constant coupling ratio over a wide range of wavelengths. Furthermore, by causing the strength of coupling between the cores of each component optical fiber to vary along the length of the longitudinal axis of each component optical fiber, it is possible to decrease the degree of sinusoidal variation in the wavelength dependance characteristics of each component optical fiber, thereby making it possible to further achieve optical coupling which is wavelength independent and thus considerably constant over a wide range of wavelengths.

13 Claims, 7 Drawing Sheets

OPTICAL FIBER COUPLER AND A FABRICATION METHOD FOR THE SAME

BACKGROUND OF THE INVENTION

The present invention concerns couplers for optical fibers. For coupling optical signals and for causing optical signals to branch over one or more optical fibers, one such coupler known in the art is referred to as the fused-elongated type coupler.

In FIG. 1, one example of a conventional fused-elongated type optical fiber coupler is shown. The optical fiber coupler 1 shown in the drawing is formed by aligning a section of each of two component optical fibers 2, mutually thermally fusing the aligned sections thereby forming a fused section, and then elongating or drawing out the heated fused section to form a fused-elongated region 3.

In the above described fused-elongated region 3, the diameter of each component optical fiber 2 is reduced as is the core of the component optical fibers 2. To the extent that diameters of the cores of the optical fibers are reduced, a proportionately greater fraction of the energy of the light propagated therein leaks through the cladding which surrounds the core. Also, to the extent that the component optical fibers 2 are drawn out and thereby elongated, the distance between the cores of adjacent optical fibers 2 is reduced, and due to this fact, the coupling between the propagated modes of the individual fibers becomes extremely great. In this way, the optical signal incident on one fiber 2 becomes split and is thus emitted at ports of both optical fibers 2. In the same way, separate optical signals incident on both component optical fibers 2 become combined.

With the conventional optical fiber coupler 1 described above, it is known that light incident on one optical fiber becomes proportioned over one or both optical fibers (referred to as coupling ratio) based on the wavelength of the incident light. For example, light incident on port A (or port B) of the optical fiber coupler 1 shown in FIG. 1 may be emitted by port C or port D, depending on the wavelength of the incident light. As illustrated by the graph of FIG. 2 which shows the percentage of light incident on port A of optical fiber coupler 1 that is emitted by port D as a function of the wavelength of the light incident on port A, the relationship between coupling ratio and wavelength is a sinusoidal function.

Optical fiber couplers do exist in which the fluctuation of coupling ratio as a function of wavelength is relatively flat. These optical fiber couplers having weak wavelength dependance for coupling ratio are known as wide wavelength range optical fiber couplers, an example of which is shown in FIG. 3. The conventional wide wavelength range optical fiber coupler 4 shown in FIG. 3 includes an optical fiber 5, a portion of which has undergone a preliminary elongation, and a conventional optical fiber 2. To form the optical fiber coupler 4, the initially elongated region of optical fiber 5 and a section of optical fiber 2 are aligned side by side and mutually thermally fused to form a fused section. The fused section thus formed is then elongated or drawn out to form a fused-elongated region 6. By virtue of the above mentioned preliminary elongation process, it is possible to create a propagation constant difference between the component optical fibers 2, 5. By so doing, it is possible to increase the mode coupling between the component optical fibers 2, 5 across the fused-elongated region 6, and thereby attain a desired coupling ratio. With such an optical fiber coupler 4, over a fairly wide range of wavelengths, a relatively level coupling ratio can be obtained, as is shown in FIG. 4. As with FIG. 2 for optical fiber coupler 1, FIG. 4 shows for optical fiber coupler 4, the percentage of light incident on port A that is emitted by port D as a function of the wavelength of the light incident on port A.

However, as FIG. 4 shows, for the conventional wide wavelength range optical fiber coupler 4, while relatively level compared with that of conventional optical fiber coupler 1, the coupling ratio as a function of wavelength does demonstrate a hump and thus, the conventional wide wavelength range optical fiber coupler 4 does not achieve truly flat, wavelength independent characteristics. The reason for this is thought to be that for the conventional wide wavelength range optical fiber coupler 4, even after elongation and reduction of the respective fibers' diameters, the central axes of each component optical fiber 2, 5 in the fused-elongated region 6 lie in the same plane. Thus, the modes which participate in coupling are thought to be limited to the fundamental modes of each core of each component optical fiber 2, 5. Based on light transmission coupling theory, it is believed that for mode coupling between only two modes, that the mode coupling waveform is such that perfectly flat wavelength characteristics cannot be attained.

SUMMARY OF THE INVENTION

In consideration of the above, it is an object of the present invention to provide a wide wavelength range optical fiber coupler that to the greatest extent possible, allows optical coupling which is wavelength independent, and thus demonstrates a constant coupling ratio over a wide range of wavelengths.

As the result of various experiments, it has been found that by causing various irregularities to be formed in the fused-elongated region of an optical fiber coupler, thereby leading to the generation of additional modes in addition to the fundamental modes, while at the same time causing multiple mode coupling in which the above mentioned additional modes participate in the coupling of the fundamental modes, that it is possible to selectively control the coupling strength at determined wavelengths and thereby achieve optical coupling which is largely wavelength independent and thus demonstrates a relatively constant coupling ratio over a wide range of wavelengths. Furthermore, by causing the strength of coupling between the cores of each component optical fiber to vary along the length of the longitudinal axis of each component optical fiber, it is possible to decrease the degree of sinusoidal variation in the wavelength dependance characteristics of each component optical fiber, thereby making it possible to further achieve optical coupling which is wavelength independent and thus considerably constant over a wide range of wavelengths.

Accordingly, the present invention provides an optical fiber coupler characterized in that, for a defined section in which two or more component single mode optical fibers are thermally fused and elongated thereby forming a fused-elongated region which constitutes the optical fiber coupler, for the component fibers in the fused-elongated region, irregularities have been introduced so that the mode coupling state between the component fibers in the fused-elongated region is multiple mode coupling.

Also, the present invention provides a method of manufacturing for an optical fiber coupler characterized in that, for a defined section in which two or more component single mode optical fibers are aligned side by side and then thermally fused, after the fusing is carried out, irregularities are caused to be formed in the component optical fibers in the fused region so that the mode coupling state between the component fibers is multiple mode coupling, and the fused region is elongated, thereby forming a fused-elongated region which constitutes the optical fiber coupler.

Furthermore, the present invention provides an optical fiber coupler characterized in that, for a defined section in which two or more component single mode optical fibers are thermally fused and elongated thereby forming a fused-elongated region which constitutes the optical fiber coupler, for the component fibers in the fused-elongated region, the strength of coupling between the cores of each component optical fiber is caused to vary along the length of the longitudinal axis of each component optical fiber.

Also, the present invention provides a method of manufacturing for an optical fiber coupler characterized in that, for a defined section in which two or more component single mode optical fibers are aligned side by side and then thermally fused, the component optical fibers are such that optical fibers are included of which the physical parameters vary along the length of the longitudinal axis of the optical fiber.

DETAILED DESCRIPTION OF THE PREFERRED EMBODIMENTS

First Preferred Embodiment

In the following section, a first preferred embodiment of the present invention will be described with reference to FIG. 5.

Figure 5:
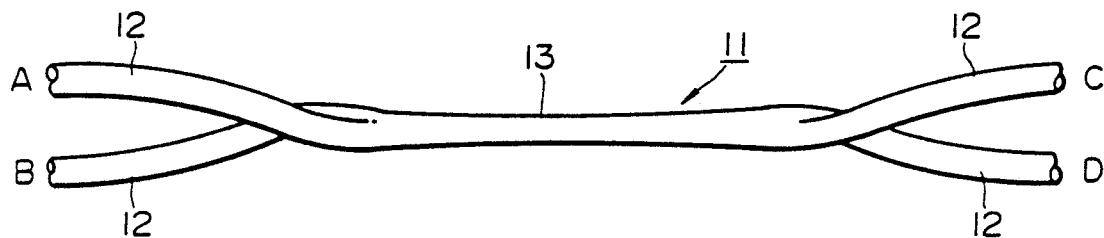
FIG. 5 is a side view of the optical fiber coupler of a first preferred embodiment of the present invention.

The wide bandpass optical fiber coupler 11 (hereafter referred to as optical fiber coupler) of the present embodiment as shown in FIG. 5 consists of a fused-elongated region 13 with a twisting deformation formed from a section of each of two strands of a component single mode optical fiber 12 (hereafter referred to as optical fiber).

The twisting deformation of the above mentioned fused-elongated region 13 is preferably formed by first imposing a twisting on a section of each component optical fiber 12 prior to forming the fused-elongated region 13, then mutually thermally fusing the twisted sections, and finally drawing out the twisted, thermally fused section. For the method of twisting the component optical fibers 12, the "SZ" twist shown in FIG. 6 has been found to be effective. With this kind of SZ twist, even through a twist is present, each component optical fiber 12 joins and leaves the fused-elongated region 13 on the same side, thus providing more convenient application. Further, with this kind of twisted fused-elongated region 13, very low optical losses and a coupling ratio which is relatively wavelength independent can be easily achieved.

Figure 6:
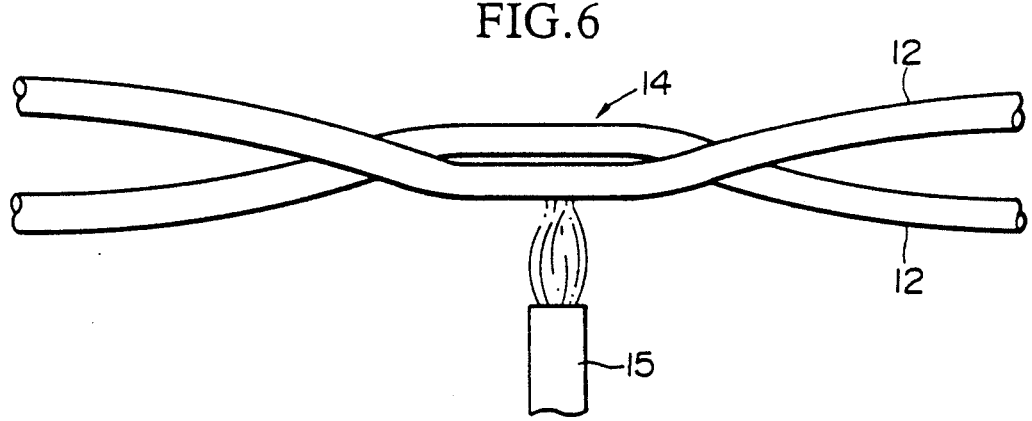
FIG. 6 is an explanatory side view for one example of a manufacturing method for the optical fiber coupler shown in FIG. 5.

Here, the example of a fabrication method for the optical fiber coupler 11 as shown in FIG. 6 will be explained. First of all, a portion of each of two component optical fibers 12 are aligned side by side, after which the SZ twist shown in the drawing is imparted on the aligned portion of the component optical fibers 12, thereby forming a twisted region 14. While each end of the twisted region 14 is held in a clamp (not shown in the drawing), the twisted region 14 is fused using a hydrogen-oxygen burner 15, after which the above mentioned clamps are moved in opposite directions, thereby stretching and elongating the fused region and forming the fused-elongated region 13. In this way, the optical fiber coupler 11 shown in FIG. 5 can be fabricated.

With this kind of optical fiber coupler 11, by imparting a twisting deformation in the fused-elongated region 13, in addition to the fundamental modes of each component optical fiber 12, additional modes are caused to be formed. Through the participation of these additional modes with the coupling of the fundamental modes, the mode coupling state becomes a multiple mode coupling state, whereby the strength of coupling at predetermined wavelengths can be controlled, and by which means it is possible to create an optical fiber coupler 11 of which the coupling ratio is largely wavelength independent and hence constant over a wide range of wavelengths.

First Experimental Example

Using two quartz single mode optical fibers having a core diameter of 9.5 $\mu$m, an external cladding diameter of 125 $\mu$m, a core-cladding refractive index difference of 0.33%, and a primary coating layer of 250 $\mu$m outer diameter, the primary coating layer was removed from each fiber over a length of 40 mm, thereby exposing the cladding. Next, the exposed sections from the two optical fibers were aligned side by side so that the exposed portions were in contact. An SZ twist was then imposed one time over the section of contacting exposed cores, with both ends of the exposed sections being fixed in a respective clamp. Next, the exposed sections between the two clamps were heated with a hydrogen-oxygen burner, whereby a central section of the exposed cores of 20 mm length was mutually fused, while at the same time, the clamps were drawn apart, thereby forming a fused-elongated region having a length of 15 mm and an external diameter of 70 $\mu$m which is the same as the optical fiber coupler 11 shown in FIG. 5.

Figure 14:
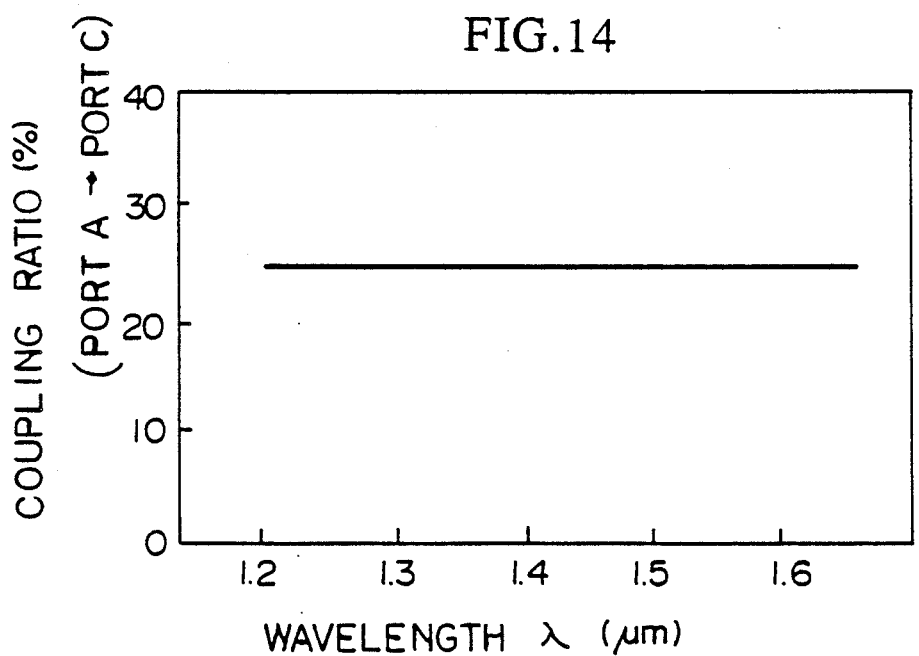
FIG. 14 is a graph illustrating the wavelength dependency properties of the coupling ratio for the optical fiber couplers shown in FIGS. 5, 7, and 9.

For the optical fiber coupler thus obtained, the wavelength dependence characteristics of the coupling ratio (the coupling ratio from port A to port C) were measured. From those results it could be seen, as is shown in FIG. 14, that the optical fiber coupler 11 produced by the above described method demonstrated a variation in the strength of the coupling ratio with wavelength that was barely detectable, and thus possessed exceedingly flat wavelength dependency characteristics.

Second Preferred Embodiment

In the following section, a second preferred embodiment of the present invention will be described with reference to FIG. 7.

Figure 7:
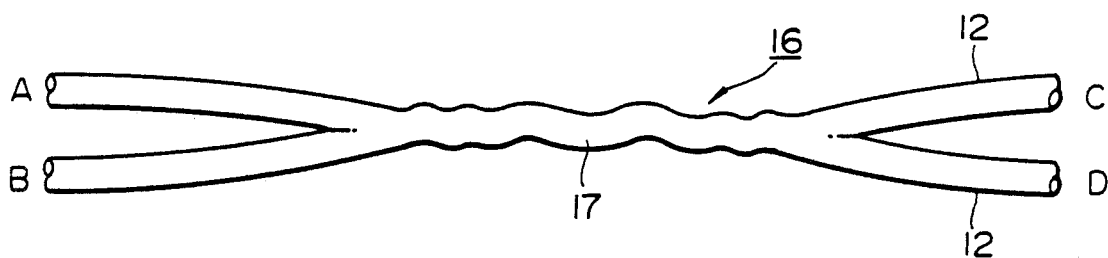
FIG. 7 is a side view of the optical fiber coupler of a second preferred embodiment of the present invention.

The optical fiber coupler 16 of the present embodiment as shown in FIG. 7 consists of a fused-elongated region 17 with a wave shaped deformation along its length, formed from a section of each of two component single mode optical fibers 12.

The extent of the above mentioned wave shaped deformation is not particularly limited, however, ordinarily, an amplitude for the waves of on the order of 5–50% of the external diameter of the fused-elongated region 17 and a frequency such that 2–10 cycles occur over the length of the fused-elongated region is preferable. Further, while a wave shaped deformation having a regular cyclic variation is acceptable, it is generally preferable for the amplitude and length of the cycles to vary randomly. Also, with the optical fiber coupler 16 of the present preferred embodiment, it is acceptable to impose a twist of the same configuration as that of the optical fiber coupler 11 of the first preferred embodiment as shown in FIG. 5.

Figure 8:
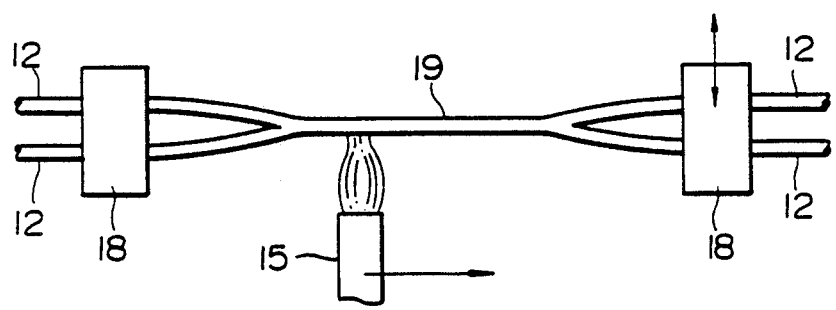
FIG. 8 is an explanatory side view for one example of a manufacturing method for the optical fiber coupler shown in FIG. 7.

To explain an example of a fabrication method for the optical fiber coupler 16 as shown in FIG. 8, first of all, a portion of each of two component optical fibers 12 are aligned side by side, after which either end of the section to be fused is fixed in a respective clamp 18. Next, the region between the two clamps 18 is heated and thereby fused using a hydrogen-oxygen burner 15, after which the clamps are moved apart along the longitudinal axis of the component optical fibers 12, thereby stretching and elongating the fused region and forming an elongated region 19. The elongated region 19 thereby formed is then heated at one end by the hydrogen-oxygen burner 15, and as the hydrogen-oxygen burner 15 is gradually moved towards the opposite end, the opposite end is caused shake up and down. By virtue of this operation, a wave shaped deformation is imposed upon the heated part of the elongated region 19, and thus as the hydrogen-oxygen burner 15 moves from one end of the elongated region 19 to the other, a wave shaped deformation having the desired amplitude and cycle length can be formed.

With this kind of optical fiber coupler 16, by imparting a wave shaped deformation along the length of the fused-elongated region 17, in addition to the fundamental modes of each component optical fiber 12, additional modes are caused to be formed. Through the participation of these additional modes with the coupling of the fundamental modes, the mode coupling state becomes a multiple mode coupling state, whereby the strength of coupling at predetermined wavelengths can be controlled, and by which means it is possible to create an optical fiber coupler 16 of which the coupling ratio is largely wavelength independent and hence constant over a wide range of wavelengths.

Second Experimental Example

Using two quartz single mode optical fibers identical to those used in the first experimental example above, after the coating layers were removed, the exposed sections of the two optical fibers were aligned side by side with either end of the exposed sections being fixed in a respective clamp. Next, the exposed sections between the two clamps were heated with a hydrogen-oxygen burner and mutually fused, while at the same time, the clamps were drawn apart, thereby forming a fused-elongated region. Next, as is shown in FIG. 8, one end of the fused-elongated region formed as described above was heated with the hydrogen-oxygen burner, and as the burner was gradually moved toward the opposite end of the fused-elongated region, the clamp holding the opposite end of the fused-elongated region was caused to shake up and down. In this way, a fused-elongated region was formed having a length of 15 mm and an external diameter of 70 $\mu$m and in which four cycles of a wave shaped deformity were created having an amplitude of approximately 30 $\mu$m. The optical fiber coupler thereby formed is the same as the optical fiber coupler 16 shown in FIG. 7.

The wavelength dependency characteristics of the optical fiber coupler thus obtained demonstrated almost no discernable difference when compared with those of the optical fiber coupler of the first preferred embodiment. Thus, it can be seen that the wavelength dependency characteristics of the optical fiber coupler of the present experimental example are exceedingly flat.

Third Preferred Embodiment

In the following section, a third preferred embodiment of the present invention will be described with reference to FIG. 9.

Figure 9:
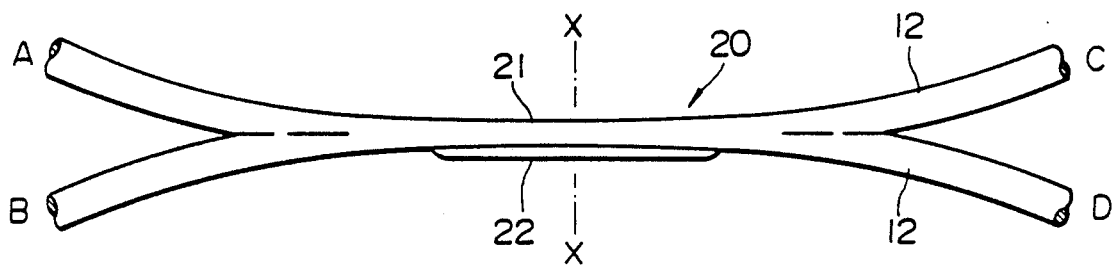
FIG. 9 is a side view of the optical fiber coupler of a third preferred embodiment of the present invention.
Figure 10:
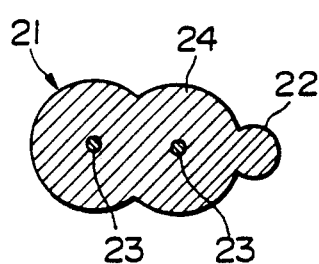
FIGS. 10 through 13 are cross sectional views for the purpose of showing examples of the arrangement of the glass components in the optical fiber coupler shown in FIG. 9.
Figure 11:
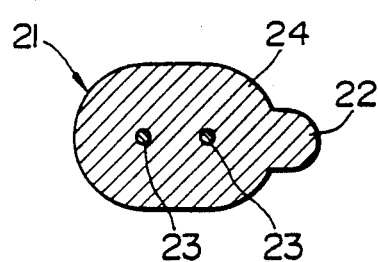
Figure 12:
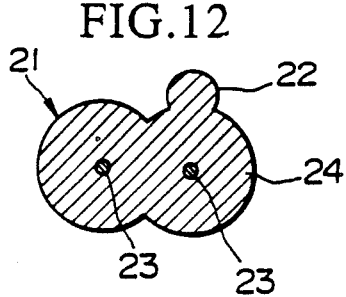
Figure 13:
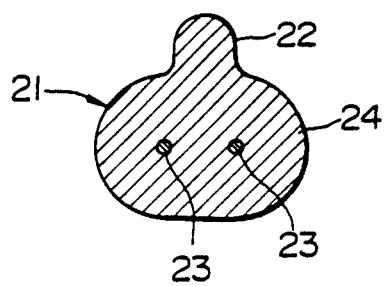

The optical fiber coupler 20 of the present embodiment as shown in FIG. 9 consists of a fused-elongated region 21 formed by thermally fusing and then drawing out a section of each of two component optical fibers 12, while at the same time, fusing a section of glass material 22 in the fused-elongated region having the same index of refraction as the cladding of the component optical fibers 12.

The position at the fused-elongated region 21 where the above mentioned section of glass material 22 is fused is not particularly limited, however, configurations for example as are shown in FIGS. 10 through 13 are desirable. With the fusing method the produces the optical fiber coupler shown in FIG. 10, the section of glass material 22 is positioned parallel to the two cores 23 of the component optical fibers 12 in the fused-elongated region 21 and fused to the outer circumference of the cladding 24 of one of the component optical fibers 12. In the case of the optical fiber coupler shown in FIG. 11, the section of glass material 22 is positioned parallel to the two cores 23 of the component optical fibers 12, and then after the section of glass material 22 is fused to the outer circumference of the cladding 24 of one of the component optical fibers 12, the fused portion is elongated to form the fused-elongated region 21. With the optical fiber coupler shown in FIG. 12, the section of glass material 22 is fused to the outer circumference of the cladding 24 of one of the component optical fibers 12 in the fused-elongated region 21 in proximity to the fused portion of the two component optical fibers 12. In the case of the optical fiber coupler shown in FIG. 13, the section of glass material 22 is fused to the outer circumference of the fused portion of the two component optical fibers 12, after which the fused portion is elongated to form the fused-elongated region 21.

The shape of the above mentioned glass material 22 is not limited to a rod shape, and glass material 22 in a particulate state is also acceptable. For the glass material 22, it is preferable that the index of refraction be equal to that of the cladding 24 of the component optical fibers 12. However, it is acceptable for the index of refraction of the glass material 22 to be as much as 1% lower than that of the cladding 24. When the index of refraction of the glass material 22 is allowed to be greater than that of the cladding 24 of the component optical fibers 12 there is a tendency for a large amount of the light energy to be absorbed in the fused-elongated region 21, and insertion losses and degradation in the ability to control the coupling ratio develop as well.

With the optical fiber coupler 20 of the present embodiment, by employing a glass material 22 having the same index of refraction as that of the material for the cladding 24 of the component optical fibers 12, in addition to the fundamental modes of each component optical fiber 12, additional modes are caused to be formed. Through the participation of these additional modes with the coupling of the fundamental modes, the mode coupling state becomes a multiple mode coupling state, whereby the strength of coupling at predetermined wavelengths can be controlled, and by which means it is possible to create an optical fiber coupler 20 of which the coupling ratio is largely wavelength independent and hence constant over a wide range of wavelengths.

As described above, the optical fiber coupler 20 of the present preferred embodiment incorporates a fused-elongated region 21 in which the component optical fibers 12 are fused and drawn out and to which glass material 22 is further fused. However, it is also acceptable to fuse the glass material 22 to a fused-elongated region 21 to which has been imposed a twist or wave shaped deformation as described in the previous preferred embodiments.

Third Experimental Example

Using two quartz single mode optical fibers identical to those used in the first experimental example above, after the coating layers were removed, the exposed sections of the two optical fibers were aligned side by side with either end of the exposed sections being fixed in a respective clamp. Next, the exposed sections between the two clamps were heated with a hydrogen-oxygen burner and mutually fused, while at the same time, the clamps were drawn apart, thereby forming a fused-elongated region of a length of approximately 18 mm and an outer diameter of approximately 75 $\mu$m. Next, a quartz rod having a length of 20 mm and a diameter of 50 $\mu$m was fused to the fused-elongated region formed as described above, thereby forming an optical fiber coupler 20 the same as that shown in FIG. 9.

The wavelength dependency characteristics of the optical fiber coupler thus obtained demonstrated almost no discernable difference when compared with those of the optical fiber coupler of the first preferred embodiment. Thus, it can be seen that the wavelength dependency characteristics of the optical fiber coupler of the present experimental example are exceedingly flat.

Fourth Preferred Embodiment

In the following section, a fourth preferred embodiment of the present invention will be described with reference to FIG. 15.

Figure 15:
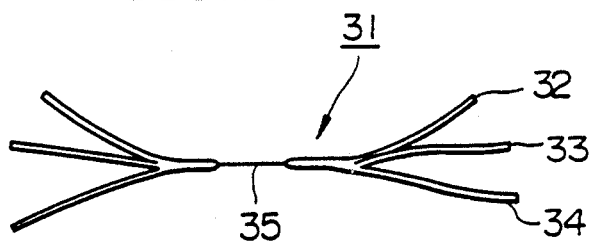
FIG. 15 is a schematic side view of the optical fiber coupler of a fourth preferred embodiment of the present invention.

The optical fiber coupler 31 of the present embodiment as shown in FIG. 15 consists of a fused-elongated region 35 formed by thermally fusing and then drawing out a section of each of three component optical fibers 32, 33, and 34. The three component optical fibers 32, 33, and 34 are such that, among each of the fibers parameters (fiber diameter, core diameter, core-cladding refractive index difference, etc.), at least one parameter varies cyclically with a relatively short cycle length over the length of the fused-elongated region 35.

In the fused-elongated region 35 as described above, the strength of the coupling ratio between the cores of the component optical fibers 32, 33, and 34 varies over the length of the fused-elongated region 35.

With the optical fiber coupler 31 of the present embodiment, the light signal incident on one of the three component optical fibers 32, 33, and 34 is caused to branch, or alternately, light signals incident on all three component optical fibers 32, 33, and 34 are caused to couple.

Figure 1:
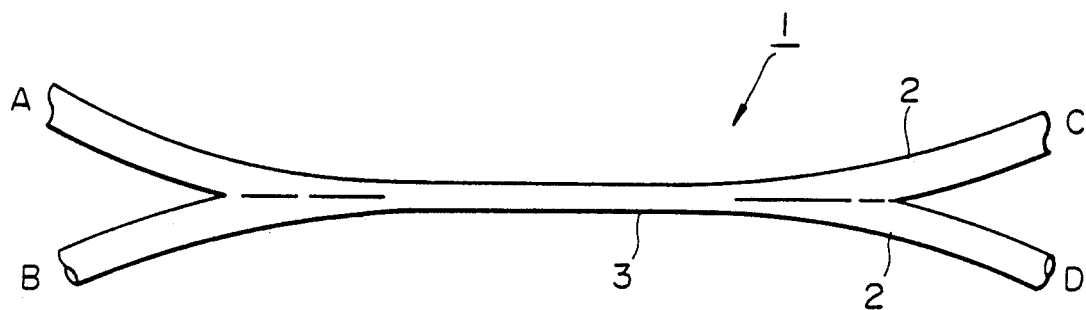
FIG. 1 is a side view of an example of a conventional optical fiber coupler.
Figure 2:
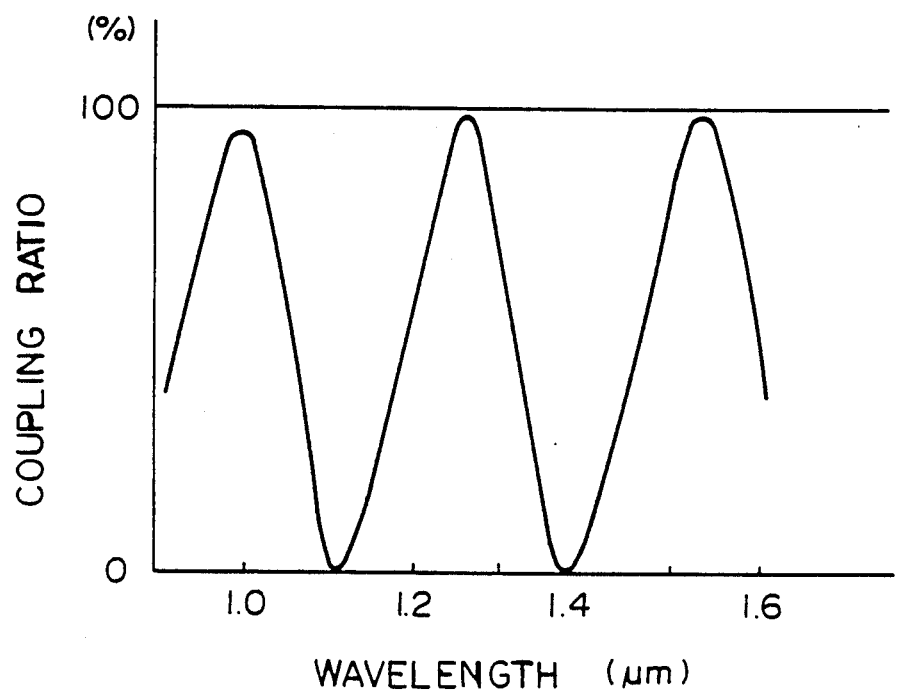
FIG. 2 is a graph illustrating the wavelength dependency properties of the coupling ratio for the conventional optical fiber coupler shown in FIG. 1.
Figure 3:
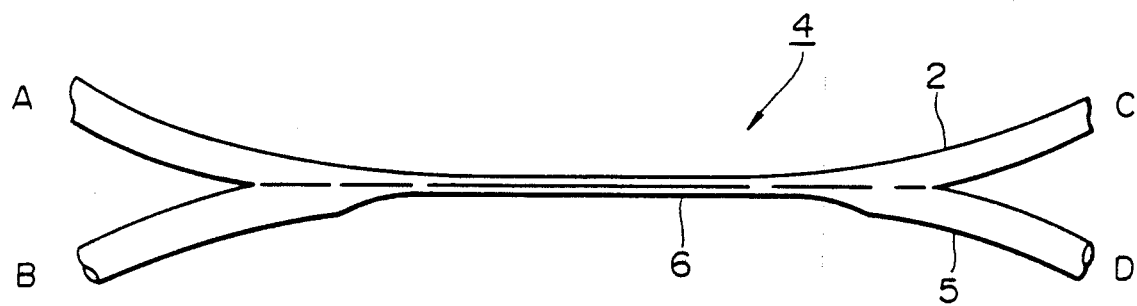
FIG. 3 is a side view of an example of a conventional wide bandpass optical fiber coupler.
Figure 4:
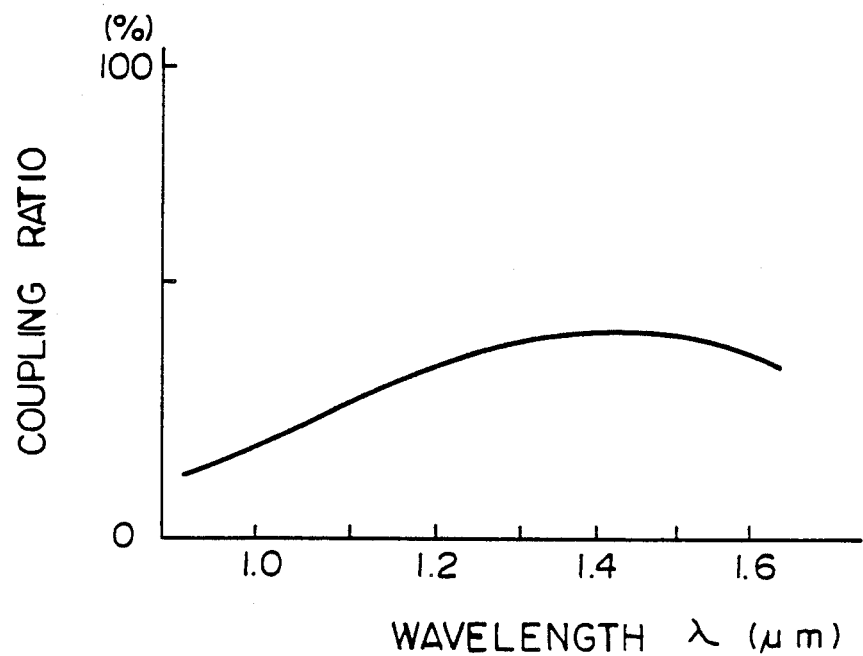
FIG. 4 is a graph illustrating the wavelength dependency properties of the coupling ratio for the conventional wide bandpass optical fiber coupler shown in FIG. 3.

By virture of the fact that the strength of the coupling ratio between the cores of the component optical fibers 32, 33, and 34 varies over the length of the fused-elongated region 35 in the optical fiber coupler 31 of the present embodiment, it is possible to decrease the degree of sinusoidal variation in the wavelength dependance characteristics of each component optical fiber, thereby making it possible to fabricate an optical fiber coupler 31 having a more constant coupling ratio with respect to wavelength than the conventional wide wavelength range optical fiber coupler 6 shown in FIG. 3.

As one example of a suitable fabrication method for the optical fiber coupler 31 of the present embodiment, a plurality of component optical fibers 32, 33, and 34 of which one or more parameters vary along the longitudinal length are aligned side by side, after which a portion of the aligned fibers is thermally fused, and then drawn out to form the fused-elongated region 35.

Fifth Preferred Embodiment

In the following section, a fifth preferred embodiment of the present invention will be described with reference to FIG. 16.

Figure 16:
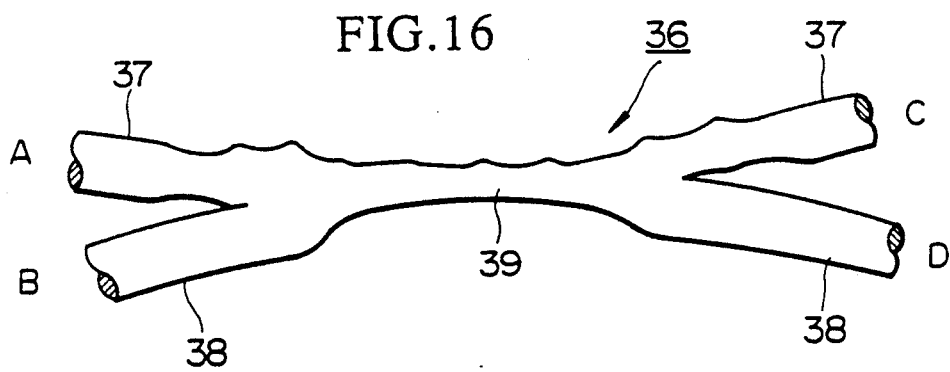
FIG. 16 is a side view of the optical fiber coupler of a fifth preferred embodiment of the present invention.

The optical fiber coupler 36 of the present embodiment as shown in FIG. 16 consists of a fused-elongated region 39 formed by mutually thermally fusing and then drawing out a section of a variable diameter optical fiber 37 of which the external diameter varies along the length of the fiber, and a fixed diameter optical fiber 38 having a constant external diameter.

The above mentioned variable diameter optical fiber 37 is a fiber of which, along a portion of its length of plurality of reduced diameter sections have been formed. The extent of the diameter reduction in the above mentioned reduced diameter sections is suitably determined based on the optical fiber diameter, core diameter, and other factors. As an example, for an optical fiber having a cladding external diameter of 125 $\mu$m, a core diameter of on the order of 10 $\mu$m, a constriction 50 $\mu$m or less, or more preferably, on the order of 30–40 $\mu$m is suitable. That is to say, for such a fiber, the reduced diameter sections should have an external diameter of at least 75 $\mu$m, or more preferably, on the order of 85–95 $\mu$m. Over the length that the variable diameter optical fiber 37 is fused with the fixed diameter optical fiber 38, that is, over 10 to 20 mm, on the of order of three to six occurrences of the reduced diameter sections are preferable.

With the optical fiber coupler 36 of the present preferred embodiment, because the variable diameter optical fiber 37 is such that among the fibers parameters (fiber diameter, core diameter, core-cladding refractive index difference, etc.), the fiber diameter is caused to vary cyclically with a relatively short cycle length along the longitudinal axis of the fiber, when a section of such a variable diameter optical fiber 37 is fused with a fixed diameter optical fiber 38, after which the fused section is drawn out to form the fused-elongated region 39, it is possible to decrease the degree of sinusoidal variation in the wavelength dependance characteristics of each component optical fiber, thereby making it possible to fabricate an optical fiber coupler 36 having a more constant coupling ratio with respect to wavelength than a conventional wide wavelength range optical fiber coupler.

While as described above, the fused-elongated region 39 of the optical fiber coupler 36 of the present embodiment is formed from a variable diameter optical fiber 37 and a fixed diameter optical fiber 38, it is also acceptable to the form the optical fiber coupler 36 by mutually fusing and drawing out a portion of each of two variable diameter optical fibers 37.

Figure 17:
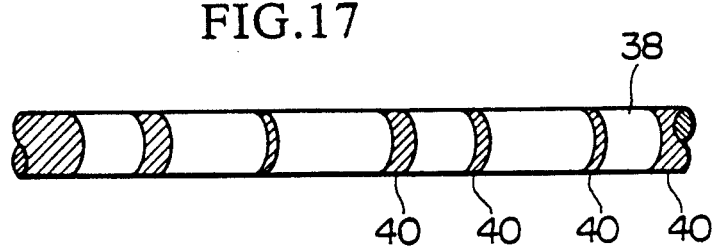
FIG. 17 through 20 are side views for the purpose of explaining one example of the manufacturing steps for the optical fiber shown in FIG. 16.

As one example of a fabrication method for the optical fiber coupler 36 of the present embodiment, FIGS. 17 through 20 illustrate the various stages of a suitable process. In this example, first of all, as is shown in FIG. 17, along the length of the outer surface of a fixed diameter optical fiber 38, a plurality of encircling narrow bands of a resist layer 40 are applied, preferably so that over the length that the variable diameter optical fiber 37 is fused with the fixed diameter optical fiber 38, that is, over 10 to 20 mm, on the of order of three to six of the bands of resist layer 40 are present. The width of the bands of resist layer 40 are not particularly limited, however, a width of on the order of 10 to 30% of the external diameter of the optical fiber is generally preferable. For the bands of resist layer 40, a resin composition that is resistant to glass etchant is desirable.

Next, the optical fiber 38 is dipped in etchant, whereby the bands not covered by the bands of resist layer 40 are etched, thereby forming reduced diameter sections 41. For the above mentioned etchant, a glass-corrosive etchant that is capable of etching the quartz cladding of the optical fiber 38 is suitable, and in particular, an acid type etchant can be suitably applied. After the bands not covered by the bands of resist layer 40 are etched to a predetermined depth, the optical fiber is removed from the etchant and rinsed with water, after which the bands of resist layer 40 are removed with a suitable solvent.

Figure 18:
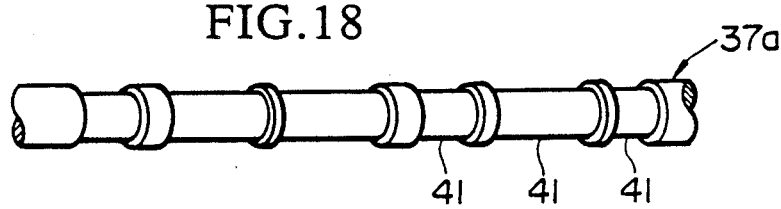

By virtue of the above described etching process, a variable diameter optical fiber 37a is formed having a plurality of reduced diameter sections 41 along its length, as is shown in FIG. 18. The variable diameter optical fiber 37a formed by the above described etching process can be used immediately, however, it is preferable to subject the etched variable diameter optical fiber 37a shown in FIG. 18 to fire polishing by heating the outer surface of the optical fiber 37a with a hydrogen-oxygen flame, whereby the transitions between the reduced diameter sections 41 and the non-etched sections is caused to be less sharp, as is shown in FIG. 19.

Figure 19:
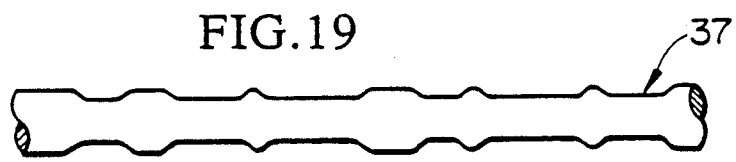
Figure 20:
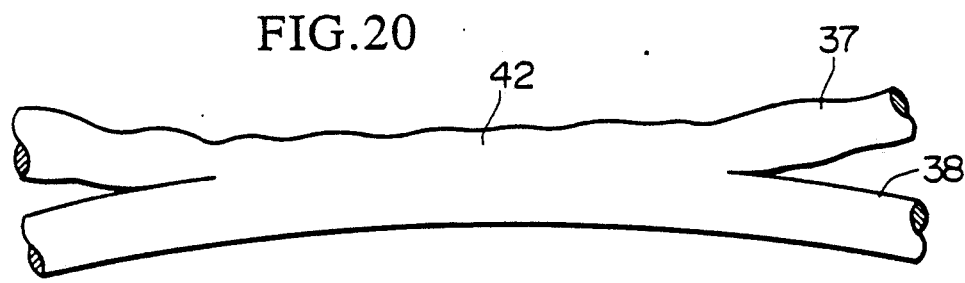

Next, the variable diameter optical fiber 37 shown in FIG. 19 and a fixed diameter optical fiber 37 are aligned side by side, after which the aligned fibers are mutually thermally fused over a portion of their length, thereby forming a fused section 42 as shown in FIG. 20, which is then drawn out to form the fused-elongated region 39. By means of the above described processes, the optical fiber coupler 36 shown in FIG. 16 is fabricated.

With the manufacturing method according to the above described example, because the provided aqueous etching process can be carried out in one step, thereby forming a plurality of the reduced diameter sections 41, the manufacture of the variable diameter optical fiber 37 can be carried out easily, efficiently, and at the same time, reduced diameter sections 41 are uniformly formed.

Figure 21:
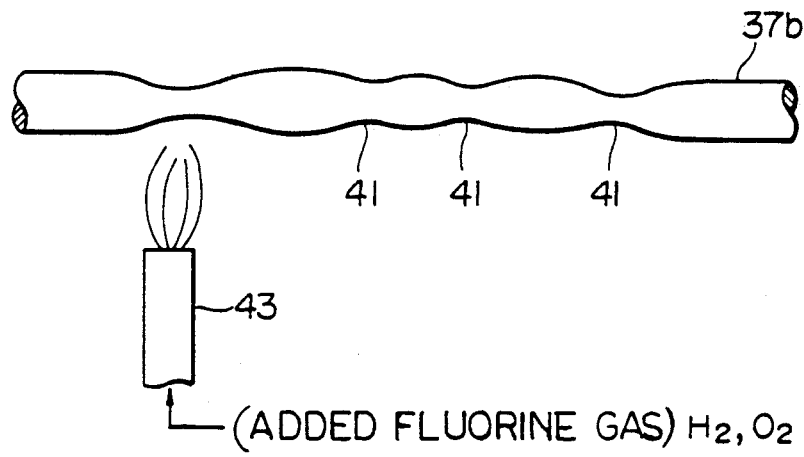
FIG. 21 is an explanatory side view for another example of a manufacturing method for the optical fiber coupler shown in FIG. 16.

In FIG. 21, another example of a manufacturing method for the optical fiber coupler 36 shown in FIG. 16 is illustrated.

With the first manufacturing method described, an aqueous etching process is carried out, thereby forming the plurality of reduced diameter sections 41 of the variable diameter optical fiber 37b. In this next manufacturing example, however, a dry etching process will be described. When the variable diameter optical fiber 37 is formed by dry etching, a hydrogen-oxygen burner 43 is used for which the hydrogen-oxygen gas mixture also includes glass-corrosive fluorine gas. Applying the burner at fixed intervals along the surface of a fixed diameter optical fiber 38 and thereby etching the outer surface at the point where the burner is applied, a plurality of reduced diameter sections 41 are formed at fixed intervals, thereby forming the variable diameter optical fiber 37.

With the manufacturing method incorporating a dry etching process as described above, the manufacturing process is generally easier and more efficient than when compared with the aqueous etching described previously.

Fourth Experimental Example

Using quartz single mode optical fiber material having an external cladding diameter of 125 μm, core diameter of 9.5 μm, and a core-cladding refractive index difference of 0.32%, the optical fiber coupler 36 shown in FIG. 16 was manufactured.

Using UV setting epoxy resin, resist layer was applied over a portions of the surface of a strand of the above described optical fiber material, leaving the surface of the optical fiber exposed at the portions to be etched. Next, the fiber was immersed in hydrofluoric acid for approximately ten hours thereby carrying out etching, after which the fiber was rinsed with water. The optical fiber was then washed in an organic solvent in order to remove the UV setting resin previously applied. By the above described process, an optical fiber was formed having over a portion of its length four etched sections (reduced diameter sections) of a depth of approximately 40 μm and a width of approximately 4 mm. The interval between adjacent etched sections was approximately 800 μm. Next, the etched optical fiber was fire polished in a hydrogen-oxygen flame, whereby a variable diameter optical fiber was formed. The variable diameter optical fiber thereby formed and a fixed diameter optical fiber were then aligned side by side, after which the aligned fibers were fixed in a pair of clamps, one at either end of the etched region formed as described above. The section of the two optical fibers between the two clamps was then heated with an hydrogen-oxygen flame, whereby a fused section of approximately 20 mm in length was formed. The clamps were then drawn apart along the longitudinal axis of the optical fibers, by which means a fused-elongated region approximately 15 mm long was formed which was identical with the optical fiber coupler 36 shown in FIG. 16.

Figure 24:
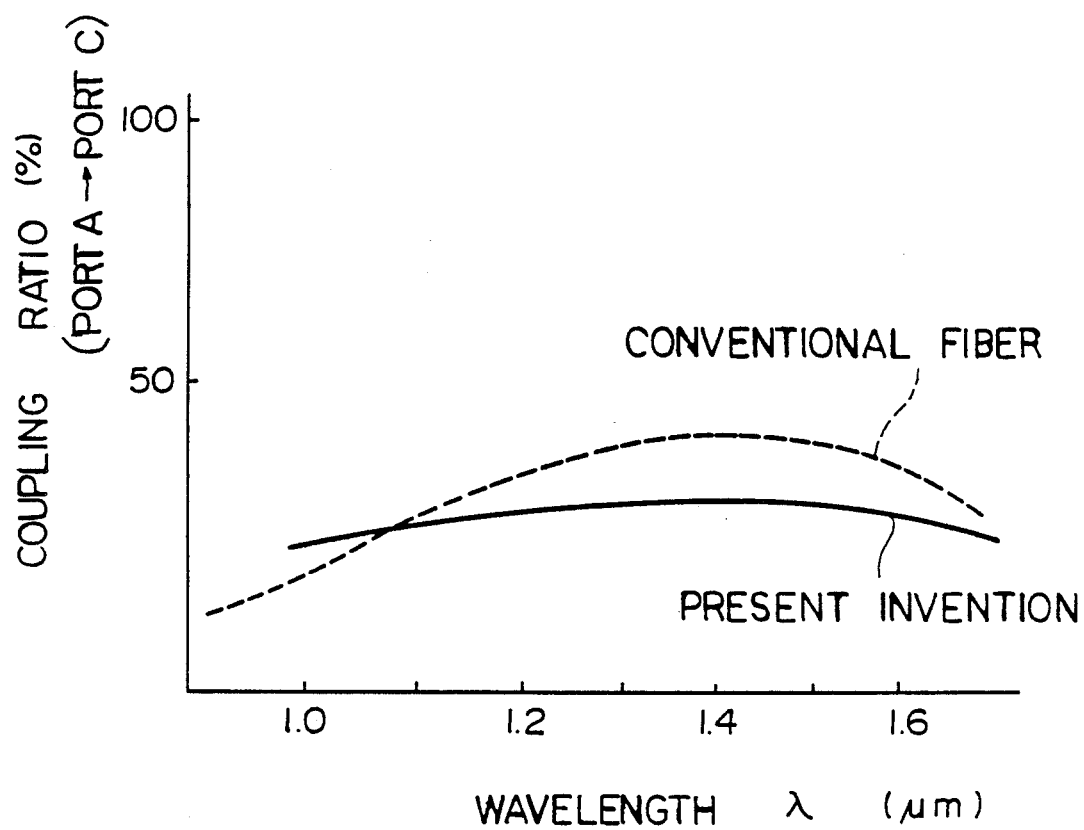
FIG. 24 is a graph illustrating the wavelength dependency properties of the coupling ratio for the optical fiber couplers shown in FIGS. 16 and 22.

The wavelength dependency characteristics of the optical fiber coupler thus obtained were measured, the results of which are shown in FIG. 24. As shown by the solid line (experimental example), compared with the conventional wide wavelength range optical fiber coupler shown in FIG. 6 represented by the broken line in FIG. 24, the coupling ratio of the optical fiber coupler 36 is relatively flat with respect to the wavelength of the incident light.

Sixth Preferred Embodiment

Figure 22:
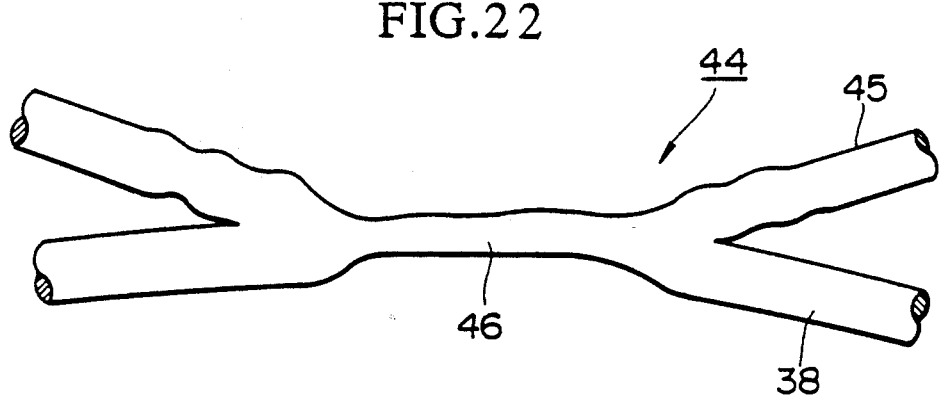
FIG. 22 is a side view of the optical fiber coupler of a sixth preferred embodiment of the present invention.

In the following section, a sixth preferred embodiment of the present invention will be described with reference to FIG. 22.

The optical fiber coupler 44 of the present embodiment as shown in FIG. 15 consists of a fused-elongated region 46 formed by thermally fusing a section of each of two component optical fibers 38, 45 and then drawing out the fused section. The component optical fiber 38 is a fixed diameter optical fiber 38 as was described for the previous example. The component optical fiber 45 is a variable propagation constant optical fiber 45 of which the diameter of the core and the external diameter of the cladding varies over the length of the fiber, whereby the propagation constant of the optical fiber 45 is caused to vary over its length.

The above mentioned variable propagation constant optical fiber 45 is manufactured by causing a plurality of swellings and constrictions to be formed in an ordinary optical fiber 38, whereby the diameter of the core and the external diameter of the cladding is caused to vary over the length of the fiber, by which means the propagation constant of the optical fiber 45 is caused to vary along its length. The above mentioned plurality of swellings and constrictions are formed by heating the ordinary optical fiber 38 and applying pressure or tension at various points, thereby creating portions having increased or reduced diameters over a section of the optical fiber 38. It is preferable that the above mentioned swellings and constrictions are formed so that there are approximately three to six occurrences over the length of the optical fiber 45 that is to be fused, that is, over 10 to 20 mm.

With the optical fiber coupler 44 of the present embodiment, because the variable propagation constant optical fiber 45 is such that the outer fiber diameter and core diameter are caused to vary cyclically with a relatively short cycle length along the longitudinal axis of the fiber, and hence the propagation constant is caused vary along the longitudinal axis of the fiber, when a section of such a variable propagation constant optical fiber 45 is fused with a fixed propagation constant optical fiber 38, after which the fused section is drawn out to form the fused-elongated region 46, it is possible to decrease the degree of sinusoidal variation in the wavelength dependance characteristics of each component optical fiber, thereby making it possible to fabricate an optical fiber coupler 44 having a more constant coupling ratio with respect to wavelength than a conventional wide wavelength range optical fiber coupler.

In the example described above, the optical fiber coupler 44 of the present embodiment was formed by mutually fusing a section from each of a variable propagation constant optical fiber 45 and a fixed propagation constant optical fiber 38. However, it is also acceptable to form the optical fiber coupler by mutually fusing a section from each of two variable propagation constant optical fibers 45.

Figure 23:
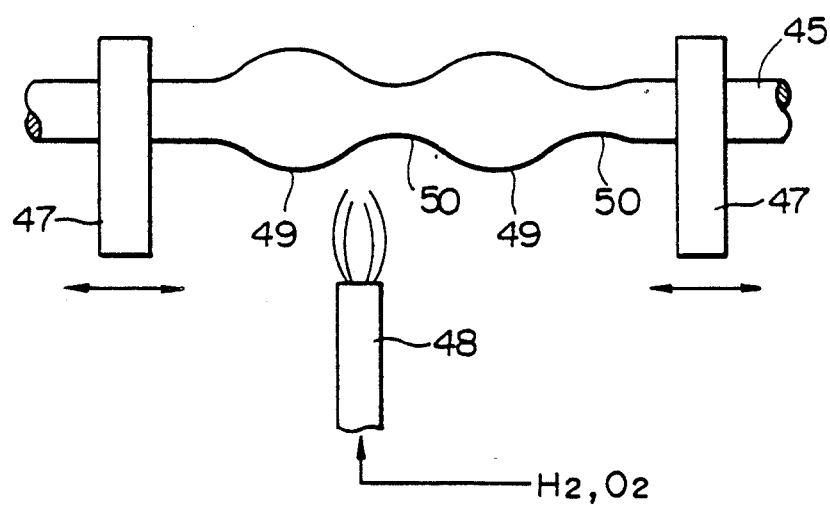
FIG. 23 is an explanatory side view for one example of a manufacturing method for the optical fiber coupler shown in FIG. 22.

In FIG. 23, an example of one fabrication method of the optical fiber coupler 44 of the present embodiment is shown. In this fabrication method, a section of a fixed propagation constant optical fiber 38 is fixed at either end by a pair of clamps 47. Then, the section of optical fiber 38 between the two clamps 47 is locally heated with a hydrogen-oxygen burner 48, after which the clamps 47 are either moved apart or together, thereby applying respectively tension or pressure to the section of optical fiber 38 between the two clamps 47, and hence at the locally heated portion. By repeating this process several times, a plurality of swellings 49 and constrictions 50 are formed in a section of the optical fiber 38, thus forming the variable propagation constant optical fiber 45. Next, the variable propagation constant optical fiber 45 thus formed and a fixed propagation constant optical fiber 38 are aligned side by side, and a section from each are mutually thermally fused, and then drawn out, thereby forming the fused-elongated region 46. In this way, the optical fiber coupler 44 shown in FIG. 22 is thus manufactured. By employing the process as thus described, it is possible to manufacture the variable propagation constant optical fiber 45 used in the manufacture of the optical fiber coupler 44 without imposing any bending or stress in the variable propagation constant optical fiber 45.

Fifth Experimental Example

Using the same quartz single mode optical fiber material employed in the fourth experimental example, a section of the optical fiber was fixed at either end by a pair of clamps. Then, the section of the optical fiber between the two clamps was locally heated with a small size hydrogen-oxygen burner, after which the clamps were either moved apart or together, thereby applying respectively tension or pressure to the section of optical fiber between the two clamps. By repeating this process three more times, two swellings having a diameter of approximately 140 μm and two constrictions having a diameter of approximately 110 μm were formed in the optical fiber, as shown in FIG. 23, thus forming the variable propagation constant optical fiber. Next, the variable propagation constant optical fiber thus formed and a fixed propagation constant optical fiber were aligned side by side, and a section from each are mutually thermally fused, and then drawn out by the same method of experimental example 4, thereby forming a fused-elongated region, by which means the optical fiber coupler 44 shown in FIG. 22 was manufactured.

The wavelength dependency characteristics of the optical fiber coupler thus obtained were measured, the results of which were found to be nearly the same as those of the optical fiber coupler 16 of the fourth experimental example.

The various examples of the present invention presented in the above preferred embodiments are merely examples and are in no way to be construed as limiting the present invention. It is possible, for example, to employ three or more optical fibers in the optical fiber coupler of the present invention with acceptable results. It should be understood that the optical fiber coupler of the present invention includes all forms encompassed by the appended claims.

What is claimed is:

1. An optical fiber coupler formed by fusing a section of each of at least two component single mode optical fibers, and then elongating the fused section to form a fused-elongated region, wherein at least two permutations are introduced into said fused-elongated region so that a mode coupling state between said at least two component single mode optical fibers in said fused-elongated region is a multiple mode coupling state.

2. An optical fiber coupler in accordance with claim 1, wherein each said at least two permutations is a wave twist deformation introduced into said fused-elongated region.

3. An optical fiber coupler in accordance with claim 1, wherein each said at least two permutations is a wave shaped deformation introduced into one or more of said at least two component single mode optical fibers in said fused-elongated region.

4. An optical fiber coupler formed by fusing a section of each of at least two component single mode optical fibers, and then elongating the fused section to form a fused-elongated region, wherein at least two permutations are introduced into said fused-elongated region so that a mode coupling state between said at least two component single mode optical fibers in said fused-elongated region is a multiple mode coupling state and wherein each said at least two permutations is a glass material which is fused into said fused-elongated region, said glass material having an index of refraction no greater than the index of refraction of claddings of said at least two component single mode optical fibers.

5. An optical fiber coupler formed by fusing a section of each of at least two component single mode optical fibers, and then elongating the fused section to form a fused-elongated region, wherein a strength of mode coupling between cores of said at least two component single mode optical fibers varies along a longitudinal axis of said fused-elongated region.

6. An optical fiber coupler in accordance with claim 5, wherein each of said at least two component single mode optical fibers is a variable external diameter optical fiber of which an external diameter varies along a longitudinal axis of said variable external diameter optical fiber in said fused-elongated region.

7. An optical fiber coupler in accordance with claim 5, wherein each of said at least two component single mode optical fibers is a variable propagation constant optical fiber of which a propagation constant varies along a longitudinal axis of said variable propagation constant optical fiber in said fused-elongated region.

8. A manufacturing method for an optical fiber coupler in which sections of each of at least two component single mode optical fibers are aligned side by side and mutually thermally fused thereby forming a fused section, and then said fused section is elongated to form a fused-elongated region, wherein at least two permutations are introduced into said fused-elongated region so that a mode coupling state between said at least two component single mode optical fibers in said fused-elongated region is a multiple mode coupling state.

9. A manufacturing method for an optical fiber coupler in which sections of each of at least two component single mode optical fibers are aligned side by side and mutually thermally fused thereby forming a fused section, and then said fused section is elongated to form a fused-elongated region, wherein at least one of said at least two component single mode optical fibers has one or more optical fiber parameters which varies along a longitudinal axis of said optical fiber in said fused-elongated region.

10. A manufacturing method for an optical fiber coupler in which sections of each of at least two component optical fibers are aligned side by side and mutually thermally fused thereby forming a fused section, and then said fused section is elongated to form a fused-elongated region, wherein at least one of said at least two component optical fibers is a variable diameter optical fiber of which a diameter varies along a longitudinal axis of said variable diameter optical fiber, said variable diameter optical fiber formed by an etching process which is a liquid etching process in which bands of a resist layer are applied around a circumference of said optical fiber at fixed intervals over at least a section of said optical fiber, thereby forming circumferential alternating bare optical fiber bands and resist layer covered optical fiber bands over said section of said optical fiber, then immersing said section of said optical fiber in an etchant whereby said bare optical fiber bands are etched, then removing said bands of resist layer.

11. A manufacturing method for an optical fiber coupler in which sections of each of at least two component optical fibers are aligned side by side and mutually thermally fused thereby forming a fused section, and then said fused section is elongated to form a fused-elongated region, wherein at least one of said at least two component optical fibers is a variable diameter optical fiber of which a diameter varies along a longitudinal axis of said variable diameter optical fiber, said variable diameter optical fiber formed by an etching process which is a dry etching process in which a flame containing a gas having glass-corrosive properties is applied at at least one location along at least a section of said optical fiber, thereby effecting a dry etching of said optical fiber at said at least one location along at least a section of said optical fiber.

12. A manufacturing method for an optical fiber coupler in which sections of each of at least two component optical fibers are aligned side by side and mutually thermally fused thereby forming a fused section, and then said fused section is elongated to form a fused-elongated region, wherein at least one of said at least two component optical fibers is a variable propagation constant optical fiber of which a propagation constant varies along a longitudinal axis of said variable propagation constant optical fiber, said variable propagation constant optical fiber formed by locally applying heat at at least one location along at least a section of said optical fiber, then applying tension parallel to a longitudinal axis of said section of said optical fiber, thereby creating an decreased diameter portion at said at least one location.

13. A manufacturing method for an optical fiber coupler in which sections of each of at least two component optical fibers are aligned side by side and mutually thermally fused thereby forming a fused section, and then said fused section is elongated to form a fused-elongated region, wherein at least one of said at least two component optical fibers is a variable propagation constant optical fiber of which a propagation constant varies along a longitudinal axis of said variable propagation constant optical fiber, said variable propagation constant optical fiber formed by locally applying heat at at least one location along at least a section of said optical fiber, then applying pressure parallel to a longitudinal axis of said section of said optical fiber, thereby creating an increased diameter portion at said at least one location.

* * * * *